(12) United States Patent
Abbasi (10) Patent No.: US 9,038,750 B2
(45) Date of Patent: May 26, 2015

(54) ROTARY JOINT FOR SUBTERRANEAN DRILLING

(75) Inventor: Hamid Ali Abbasi, Naperville, IL (US)

(73) Assignee: Gas Technology Institute, Des Plaines, IL (US)

(*) Notice: Subject to any disclaimer, the term of this patent is extended or adjusted under 35 U.S.C. 154(b) by 974 days.

(21) Appl. No.: 13/155,403

(22) Filed: Jun. 8, 2011

(65) Prior Publication Data

US 2012/0312600 A1    Dec. 13, 2012

(51) Int. Cl.
*E21B 7/06* (2006.01)
*E21B 7/04* (2006.01)
*F16D 3/16* (2006.01)

(52) U.S. Cl.
CPC .. *E21B 7/067* (2013.01); *F16D 3/16* (2013.01)

(58) Field of Classification Search
CPC ............. E21B 7/06; E21B 7/04; E21B 7/067;
E21B 7/062; E21B 7/046; E21B 7/061;
E21B 17/20; E21B 17/05; F16D 3/16; F16D 3/20; F16D 3/24
USPC ................. 175/320, 61, 74; 464/19, 143, 151
See application file for complete search history.

(56) References Cited

U.S. PATENT DOCUMENTS

| | | | |
|---|---|---|---|
| 5,875,859 A | 3/1999 | Ikeda et al. | |
| 6,092,610 A | 7/2000 | Kosmala et al. | |
| 6,244,361 B1 | 6/2001 | Comeau et al. | |
| 6,581,699 B1 | 6/2003 | Chen et al. | |
| 6,598,687 B2 * | 7/2003 | Eppink et al. | 175/73 |
| 6,837,315 B2 | 1/2005 | Pisoni et al. | |
| 7,234,543 B2 | 6/2007 | Schaaf | |
| 7,621,343 B2 | 11/2009 | Chen et al. | |

FOREIGN PATENT DOCUMENTS

GB    2172324    9/1986

* cited by examiner

*Primary Examiner* — Brad Harcourt
*Assistant Examiner* — Wei Wang
(74) *Attorney, Agent, or Firm* — Pauley Petersen & Erickson

(57) ABSTRACT

A rotary joint for use in directional control of a subterranean rotary steerable drilling apparatus. The rotary joint is formed by mated spherical-shaped sockets, each of which is connected with a hollow rod. By virtue of this arrangement, a continuous passageway is provided for fluid to flow through the rotary joint, which fluid may be used for cooling the rotary joint during operation of the rotary steerable drilling system.

19 Claims, 9 Drawing Sheets

ROTARY JOINT FOR SUBTERRANEAN DRILLING

BACKGROUND OF THE INVENTION

1. Field of the Invention

This invention relates to universal joints. In one aspect, this invention relates to rotary joints which permit rotary motion at varying angles. In one aspect, this invention relates to rotary joints providing interior fluid communication from one side of the joint to the other side of the joint. In one aspect, this invention relates to rotary joints for use in steerable drilling systems for subterranean drilling.

2. Description of Related Art

Typically, a wellbore is a substantially straight vertical hole. However, there are times when a drilling operator may desire to drill a non-vertical hole off the vertical wellbore, for example to enable drilling in a substantially horizontal direction into an oil or gas bearing formation. Directional drilling systems are used to control the direction of subterranean drilling systems between vertical and off-vertical as well as side-to-side directions. Directional drilling systems that allow steering while drilling typically fall into two categories: push-the-bit and point-the-bit systems, classified by their mode of operation. Push-the-bit systems operate by applying pressure to the side walls of the formation containing the well. Point-the-bit systems operate by aiming the drill bit in the desired direction, causing deviation of the well as the bit drills the bottom of the well.

Rotary steerable drilling systems used to control the direction of subterranean drilling systems between vertical and off-vertical as well as side-to-side directions allow steering of the drill bit while continuously rotating the drill string and drilling the wellbore.

One commonly used point-the-bit rotary steerable drilling system employs a bendable rotary drive shaft inside a non-rotating housing, an example of which is taught by U.K. Patent No. GB 2,172,324. As described therein, a control module comprising a casing having a bearing at each end thereof for supporting the drive shaft as it passes through the casing is utilized. Four flexible bags located in the annular space between the drilling string and the casing control the direction of the drilling by applying a radial force to the drive shaft such that the drive shaft is displaced laterally between the bearings to provide a desired curvature of the drive shaft. U.S. Pat. No. 6,244,361 to Comeau et al. teaches a deflection device consisting of two eccentric rings that is axially located between a first support location and a second support location of a rotatable drive shaft within a non-rotating housing for bending the drilling shaft between the first location and the second location.

U.S. Pat. No. 6,092,610 to Kosmala et al. teaches an actively controlled rotary steerable drilling system for directional drilling of wells having a tool collar rotated by a drill string engaged in well drilling. The bit shaft is supported by a universal joint within the collar and rotatably driven by the collar. To achieve controlled steering of the rotating drill bit, orientation of the bit shaft relative to the tool collar is sensed and the bit shaft is maintained geostationary and selectively axially inclined relative to the tool collar during drill string rotation by rotating it about the universal joint by an offsetting mandrel that is rotated counter to the collar rotation and at the same frequency of rotation. An electric motor provides rotation to the offsetting mandrel with respect to the tool collar and is servo-controlled by signal input from position sensing elements. A brake is used as necessary to maintain the offsetting mandrel and the drill shaft axis geostationary. While the use of universal joints between the deflecting device and the upstream driving shaft significantly reduces bending of the shaft and the inherent stresses/fatigue failure risks resulting from a bent shaft, universal joints are bulky and difficult to seal against high pressure drops between the inside and outside of the shaft. In addition, these joints, having only two to four points of connection, are only symmetrical about one or two axes and, thus, do not provide smooth and uniform transfer of rotational speed and torque.

U.S. Pat. No. 6,837,315 to Pisoni et al. describes a rotary steerable drilling tool having a tool collar, a bit shaft supported within the tool collar for pivotal movement about a fixed position along the bit shaft, and a variable bit shaft angulating mechanism, which includes a motor, an offset mandrel, and a variable offset coupling, disposed within the interior of the tool collar. The tool further includes a torque transmitting coupling adapted to transmit torque from the tool collar to the bit shaft at the fixed position along the bit shaft.

A bottom hole assembly for drilling a deviated borehole is taught by U.S. Pat. No. 6,581,699 to Chen et al. which utilizes a positive displacement motor or a rotary steerable device having a substantially uniform diameter motor housing outer surface without stabilizers extending radially therefrom. In the case of the positive displacement motor, the motor housing may include a fixed bend therein between an upper power section and a lower bearing section. The bit is rotated at a speed of less than 350 rpm and has a gauge section above the bit face such that the total gauge length is at least 75% of the bit diameter and at least 50% of the total gauge length is substantially full gauge. The axial spacing between the bend and the bit face is controlled to less than twelve times the bit diameter.

U.S. Pat. No. 7,234,543 to Schaaf teaches a system for directional drilling which includes a biasing subsystem configured to control a tendency of a bottom hole assembly during drilling of the borehole and a continuously variable transmission coupled by an output shaft to the biasing subsystem such that the continuously variable transmission is configured to control relative rotation of one or more components of the biasing subsystem during the drilling operation.

SUMMARY OF THE INVENTION

The invention described herein is a rotary joint. Although described herein for use in steerable drilling systems for subterranean drilling, it is to be understood that the rotary joint of this invention may be utilized in any application requiring the rotary motions provided by the joint and requiring the transport of a fluid through the joint. The rotary joint comprises a first rotary joint component having a first hollow rod having a first spherical-shaped socket fixedly connected with an end thereof and having a first longitudinal axis. The spherical-shaped socket is adapted to enable fluid flow through the first hollow rod and the first spherical-shaped socket. The rotary joint further comprises a second rotary joint component having a second hollow rod having a second spherical-shaped socket fixedly connected with an end thereof and having a second longitudinal axis. The second spherical-shaped socket is disposed within the first spherical-shaped socket, i.e., mated with the first spherical-shaped socket, and is adapted to enable fluid flow through the second hollow rod and the second spherical-shaped socket and provide direct fluid communication between the first hollow rod and the second hollow rod. The first spherical-shaped socket and the second spherical-shaped socket are adapted through the use of guide means to rotate only around their respective longitudinal axes when rotated at the same speed while being precluded from such rotation when rotated at different speeds. The guide means enable flexible transfer of rotary movement of the second spherical-shaped socket within the first spherical-shaped socket, whether the longitudinal axes of the two rotary joint components are aligned in a straight line or disposed at an angle. The joint further comprises sealing means disposed between the interior surface of the first spherical-shaped socket and the exterior surface of the second spherical-shaped socket to substantially preclude the leakage of fluid flowing through the inside of the hollow rods and spherical-shaped sockets.

Beneficially, the rotary joint of this invention enables a smooth transfer of rotational energy and torque, significantly reduces resistance to fluid flow therethrough, reduces rotational friction, provides a much sturdier, less wobbly joint, and substantially eliminates fluid leakage, whether the axes of the two spherical-shaped sockets are aligned in a straight line or disposed at an angle.

BRIEF DESCRIPTION OF THE DRAWINGS

These and other features of this invention will be better understood from the following detailed description taken in conjunction with the drawings, wherein.

DETAILED DESCRIPTION OF THE PRESENTLY PREFERRED EMBODIMENTS

Figure 1:
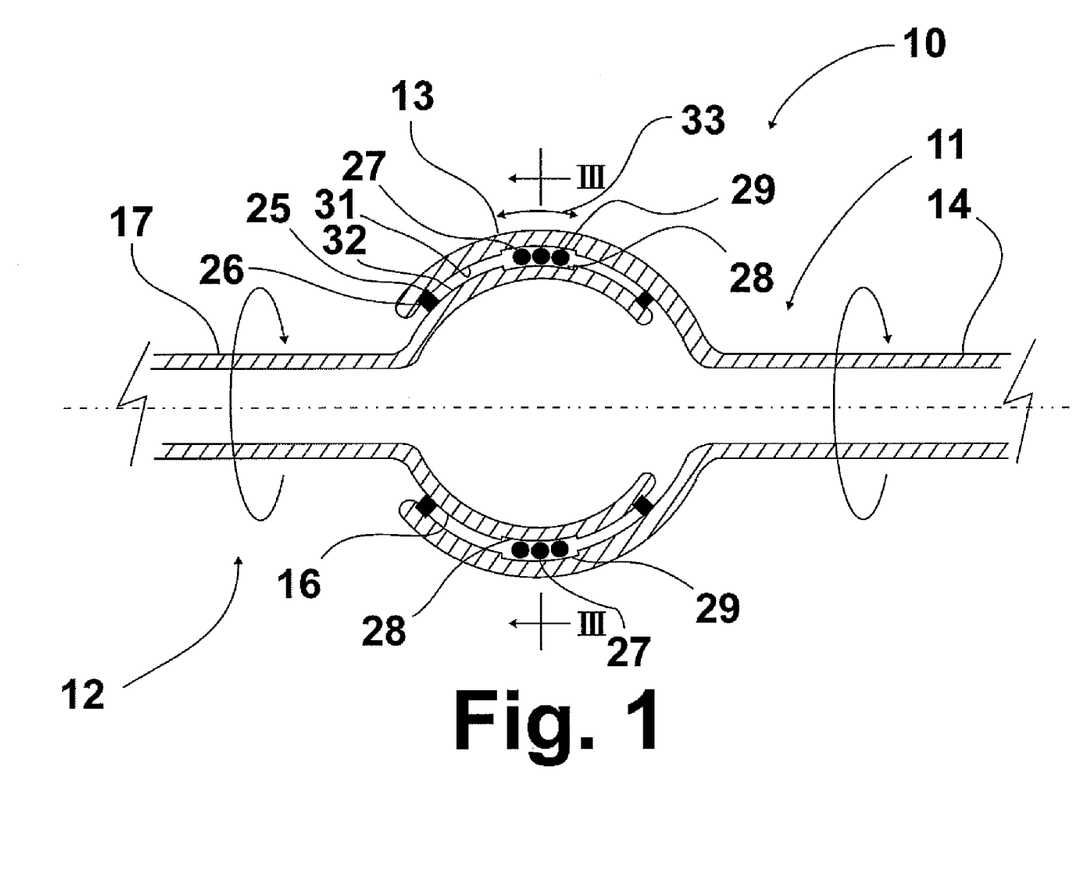
FIG. 1 is a lateral cross-sectional view of a rotary joint, aligned in a straight line, in accordance with one embodiment of this invention.
Figure 2:
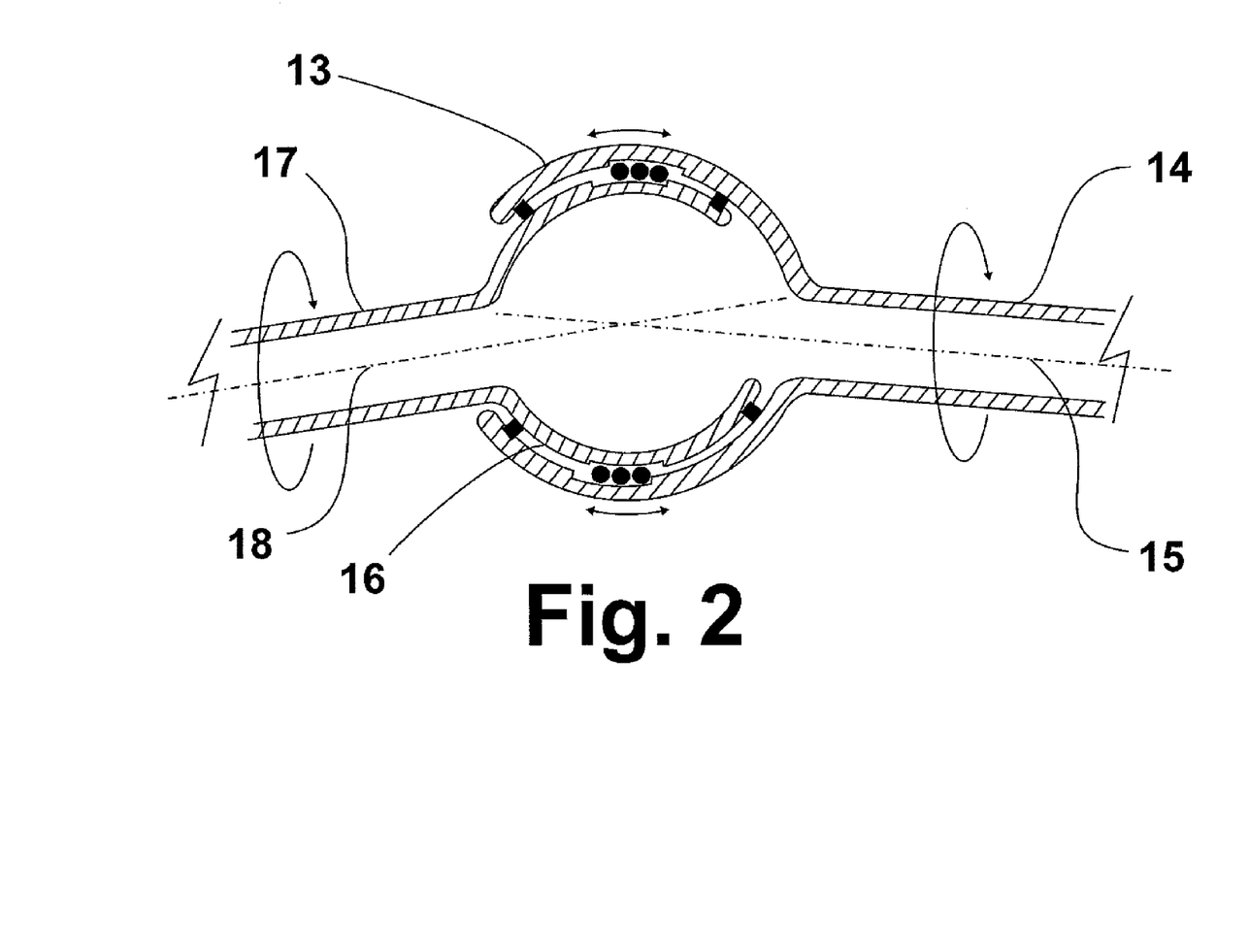
FIG. 2 is a lateral cross-sectional view of the rotary joint of FIG. 1 in an angled position whereby changing the direction of a drillbit attached thereto is effected.
Figure 9:
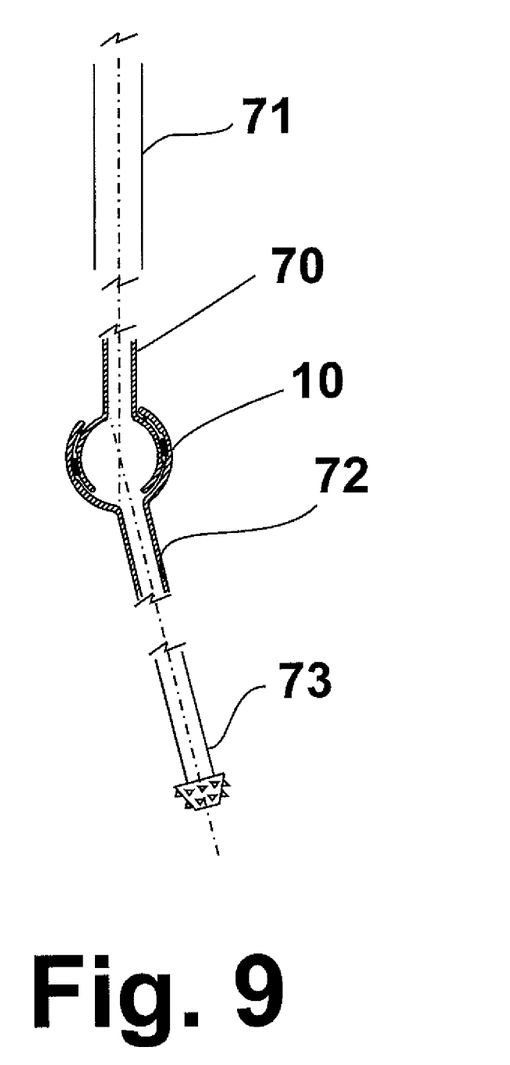
FIG. 9 is a schematic diagram showing disposition of a rotary joint in accordance with this invention disposed between a drill string and drillbit of a rotary steerable drilling system.

FIG. 1 shows a rotary joint 10 for a rotary steerable drilling system in accordance with one embodiment of this invention. As a component of a rotary steerable drilling system as shown in FIG. 9, one end of the rotary joint (the drill string end 70) is connected with a drill string 71 and the other end (the drill bit end 72) is connected with a downhole assembly, which includes a rotary drill bit 73. The rotary joint comprises two rotatably joined rotary joint components, a first rotary joint component 11 having a first spherical-shaped socket 13 fixedly connected with a first hollow rod 14, and having a first longitudinal axis 15 (FIG. 2), and a second rotary joint component 12 having a second spherical-shaped socket 16 disposed inside the first spherical-shaped socket fixedly connected with a second hollow rod 17, and having a second longitudinal axis 18 (FIG. 2). FIG. 2 shows an angled disposition of the rotary joint of this invention resulting from a rotary movement of the first and second rotary joint components so as to displace the longitudinal axes.

Each rotary joint component is adapted to enable fluid flow through the rotary joint during use. The joint is suitable for use with a wide range of fluids including, but not limited to, drilling mud, water, hydrocarbons, air, nitrogen, and other liquids and gases, slurries, foams, and mixtures thereof.

In accordance with one preferred embodiment of this invention, the rotary joint comprises two mated spherical-shaped sockets. As used herein, the term "mated" means that the spherical-shaped sockets are fitted together so as to provide minimal clearance between the surfaces of the sockets. This near perfect mating of the sockets helps to minimize fluid leakage to the environment surrounding the rotary joint and helps to minimize wobble in the rotary joint. By minimal clearance, we mean the smallest amount of space between the sockets which still permits relative rotary movement of the sockets. To enable such minimal clearance, the facing surfaces of the mating sockets preferably have mirror finishes. In accordance with one preferred embodiment of this invention, lubricants or greases are provided between the mating surfaces of the spherical-shaped sockets to reduce rotational friction between the mating surfaces. Any lubricants or greases able to withstand the conditions of downhole drilling may be used and such lubricants and greases are well known to those skilled in the art.

Figure 5:
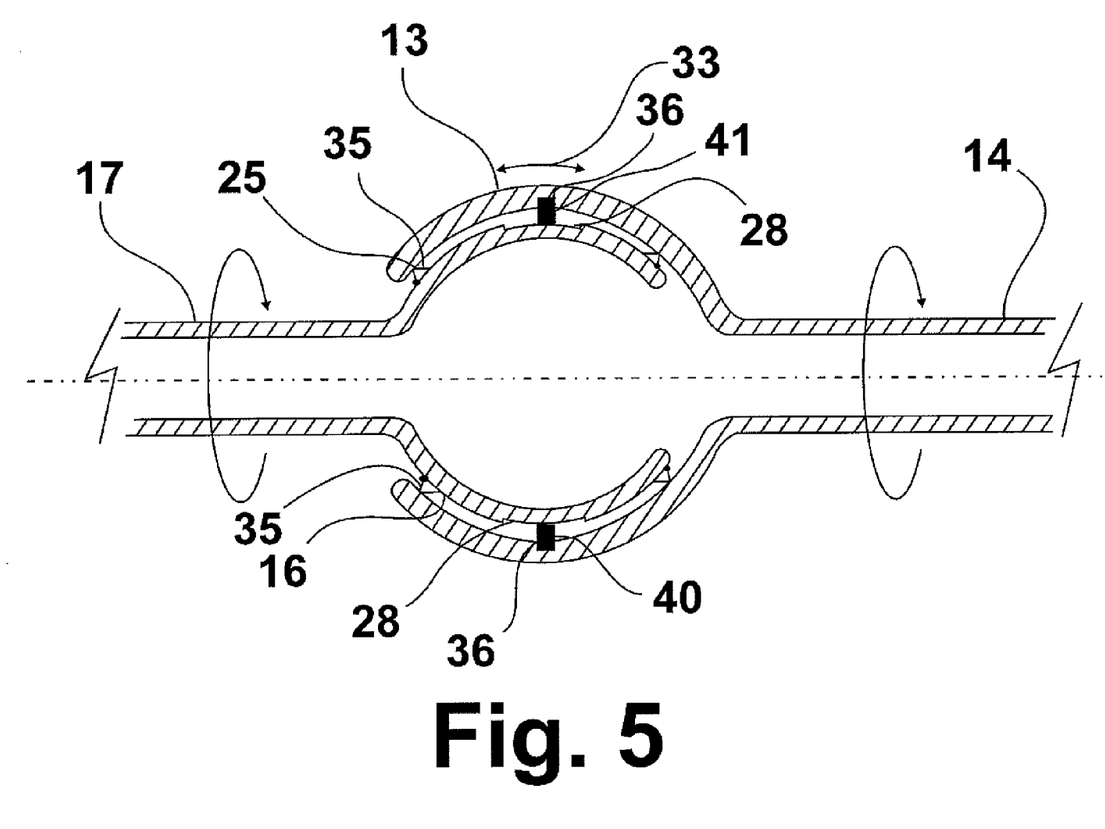
FIG. 5 is a lateral cross-sectional view of a rotary joint employing pins for providing rotary motion in accordance with one embodiment of this invention.

To substantially eliminate leakage of fluid from the interior space of the rotary joint, sealing means are provided between the interior surface 31 of first spherical-shaped socket 13 and the outer or exterior surface 32 of second spherical-shaped socket 16. In accordance with one embodiment of this invention, the sealing means comprises at least one O-ring 25, which may have any cross-sectional shape including round or rectangular, disposed within a suitable circumferential groove or channel 26 formed by the interior surface 31 of first spherical-shaped socket 13 to hold the O-ring in place and extending to contact the outer surface 32 of second spherical-shaped socket 16. It will be appreciated by those skilled in the art that the O-ring could be disposed within a circumferential groove or channel formed by the second spherical-shaped socket 16 and extend to contact the interior surface of the first spherical-shaped socket 13 and such arrangement is deemed to be within the scope of this invention. It will be further appreciated by those skilled in the art that the O-rings may be disposed in corresponding grooves or channels formed by the interior surface of the first spherical-shaped socket and the exterior surface of the second spherical-shaped socket. Suitable materials for use as sealing means include, but are not limited to, elastomeric materials such as nitriles, nitroxile, fluorinated elastomerics, and chloroprene, typically used in oilfield applications. In accordance with one embodiment of this invention, the sealing means comprise bent strips of metal or other flexible materials 35 as shown in FIG. 5.

To facilitate the transfer of rotary motion between the spherical-shaped sockets when rotating the drill string and drill bit, the rotary joint comprises rotary guide means for enabling relative rotary movement of the second spherical-shaped socket within the first spherical-shaped socket.

Figure 3:
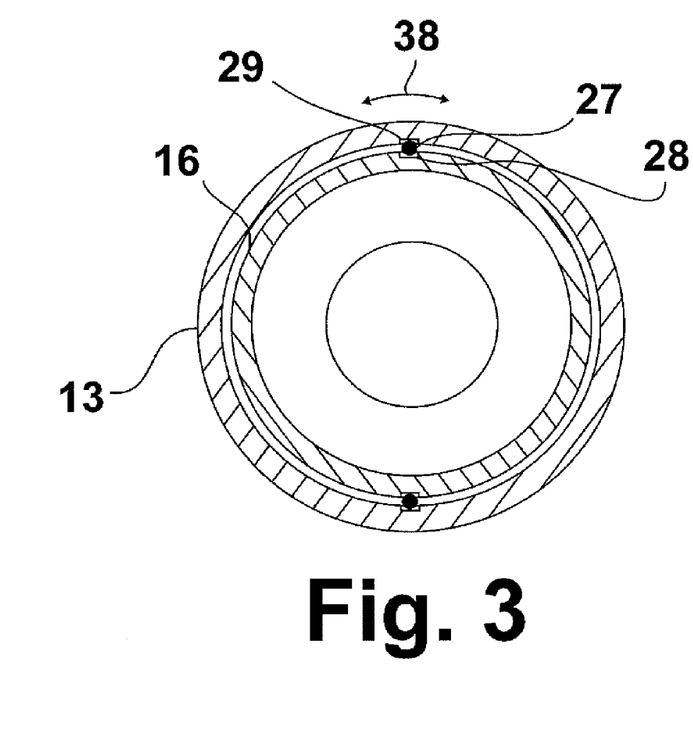
FIG. 3 is a view of the rotary joint of FIG. 1 taken along the line III-III.

In accordance with one embodiment of this invention, the rotary guide means comprises at least one bearing 27 disposed in surface indentations or depressions 28, 29 formed by the interior surface 31 of first spherical-shaped socket 13 and the exterior surface 32 of second spherical-shaped socket 16, respectively, as shown in FIGS. 1 and 3. In accordance with one embodiment of this invention, surface indentations 28, 29 are positioned symmetrically on opposite sides of the spherical-shaped sockets. In the embodiments shown in FIGS. 1 and 3, the interior and exterior surfaces of the first spherical-shaped socket 13 and the second spherical-shaped socket 16, respectively, form corresponding indentations in the form of grooves. As used herein, the term "groove" refers to an elongated channel or depression and is used interchangeably with the term "channel". The grooves or channels are elongated in a direction substantially corresponding to longitudinal axes 15, 18 of the rotary joint components 11, 12, thereby enabling relative rotational movement of the spherical-shaped sockets as indicated by arrows 33. More than two guide means may be employed to improve the strength of the rotary joint and reduce wobble.

Figure 4:
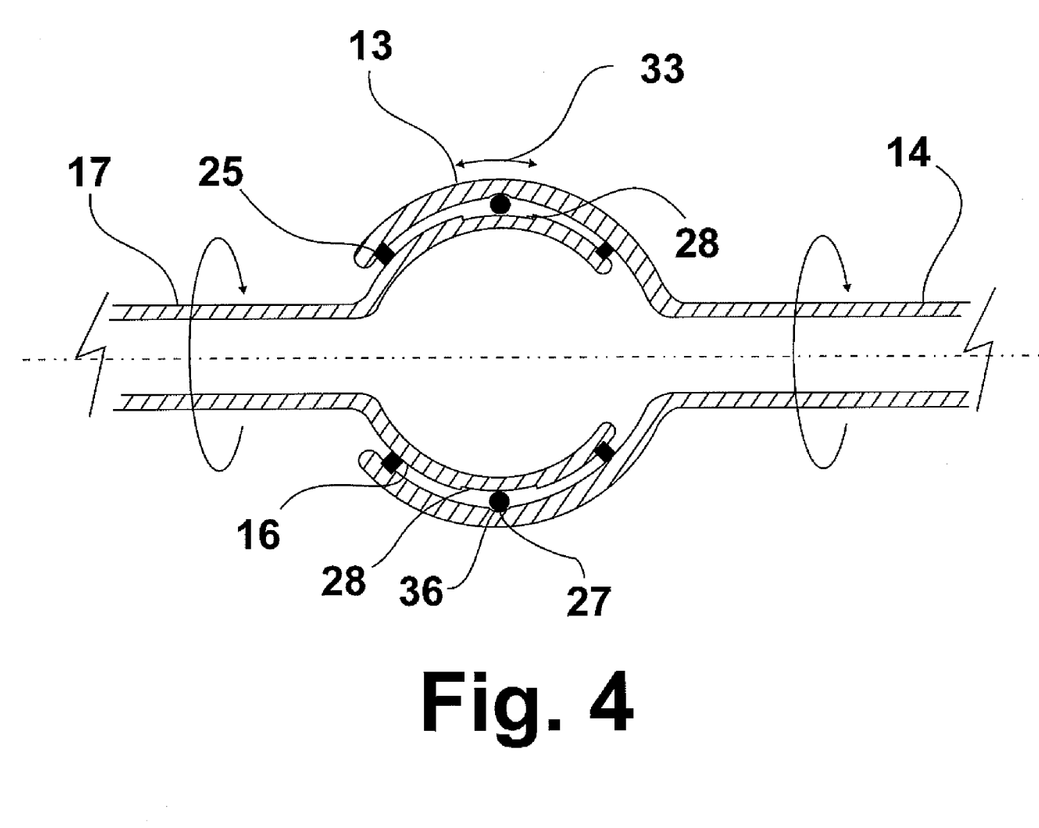
FIG. 4 is a lateral cross-sectional view of a rotary joint in accordance with another embodiment of this invention.

In accordance with one embodiment of this invention, shown in FIG. 4, the indentations formed by one of the interior surface 31 of the first spherical-shaped socket 13 and the exterior surface 32 of the second spherical-shaped socket 16 are sized to accommodate substantially only a single bearing 27. In the embodiment shown in FIG. 4, this indentation 36 is formed by the interior surface of the first spherical-shaped socket 13.

In accordance with one embodiment, shown in FIG. 5, pins 40, 41, which slide within the grooves or channels 28 formed by the exterior surface of second spherical-shaped socket 16 as the sockets are rotated, are fixedly connected with the interior surface of first spherical-shaped socket 13. The pins may have any shape suitable for sliding or gliding within the grooves or channels. In accordance with one embodiment of this invention, the pins have a shape selected from the group consisting of spherical, cylindrical, or oval. In accordance with one embodiment of this invention, indentations 26 are sized to fixedly accommodate pins 40, 41.

Figure 7:
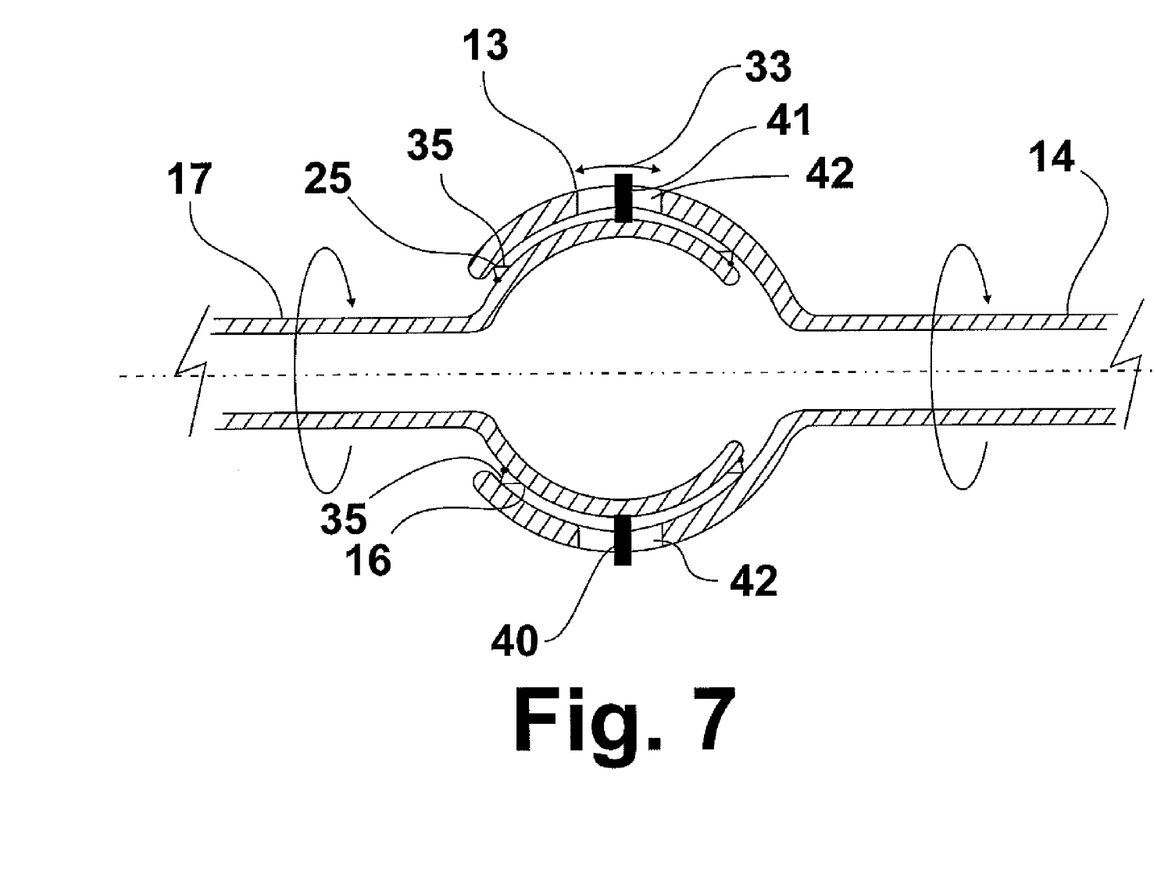
FIG. 7 is a lateral cross-sectional view of a rotary joint employing a pin and slot arrangement for providing rotary motion in accordance with one embodiment of this invention.

In accordance with one embodiment of this invention, shown in FIG. 7, the first spherical-shaped socket forms a pair of slots 42 sized to accommodate pins 40, 41 so as to permit sliding of the pins within the slots as guide means as the rotary joint components are rotated. Additional slots and pins may be provided to further enhance strength and reduce wobble.

Figure 6:
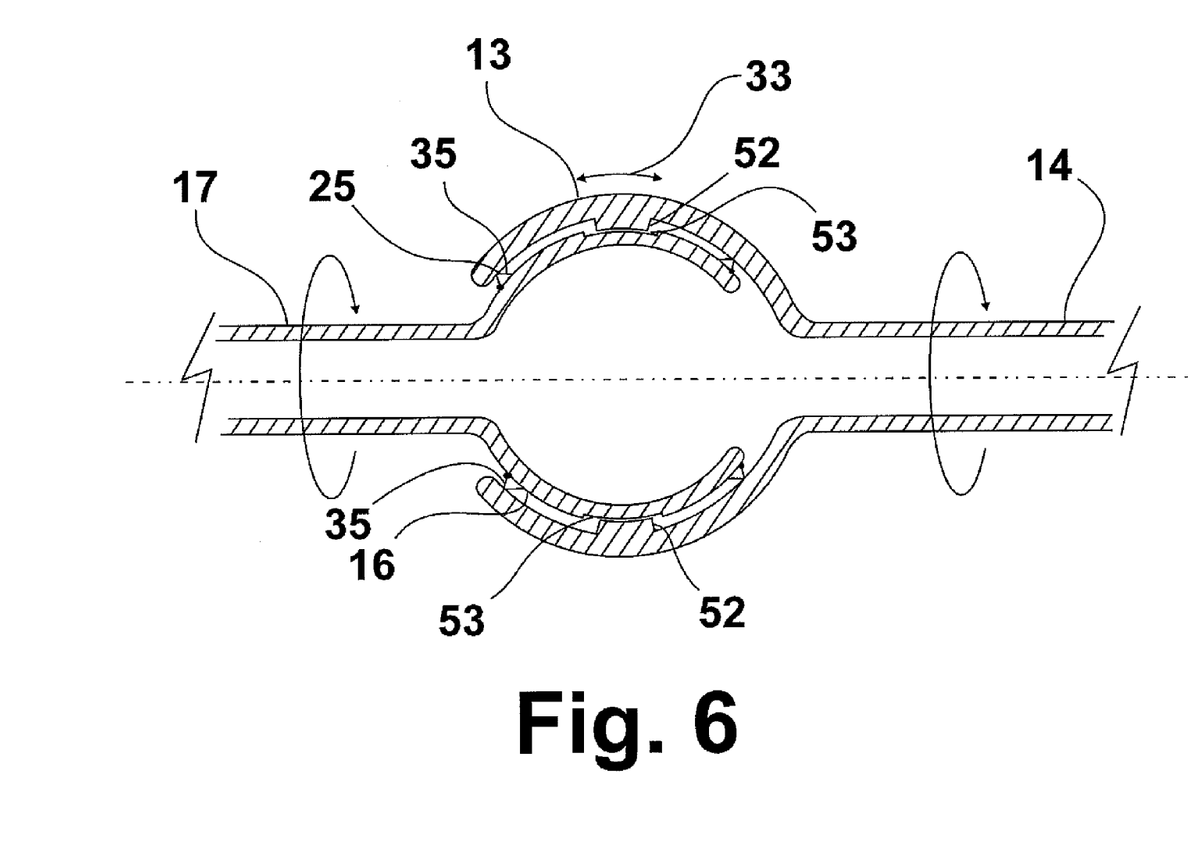
FIG. 6 is a lateral cross-sectional view of a rotary joint employing a ridge and groove approach for providing rotary motion in accordance with one embodiment of this invention.

In accordance with one embodiment of this invention as shown in FIG. 6, the guide means comprises at least one elongated ridge 52 extending in a direction parallel to the longitudinal axis of the rotary joint connected with one of an interior surface of the first spherical-shaped socket 13 and an exterior surface of the second spherical-shaped socket 16. In the embodiment shown in FIG. 6, the elongated ridge is connected with the interior surface of the first spherical-shaped socket. The at least one elongated ridge is disposed within a corresponding groove 53 formed by the other of the interior surface of the first spherical-shaped socket and the exterior surface of the second spherical-shaped surface, which groove has a groove length greater than the length of the elongated ridge. Thus, during rotation of the spherical-shaped sockets, the at least one elongated ridge slides as necessary within the groove. The width of the groove is sized to receive the elongated ridge so as to substantially preclude rotation of the spherical-shaped sockets in any direction other than a direction dictated by disposition of the groove in a direction substantially corresponding to the longitudinal axes of the rotary joint components.

In order to control the relative rotary motions of the spherical-shaped sockets to provide the desired directional control for guiding the drillbit, the sockets are locked by locking means for preventing independent rotation of the spherical-shaped sockets around their respective longitudinal axes, thereby precluding rotation of the spherical-shaped sockets in a sideways direction. In accordance with one embodiment of this invention, the locking means are provided by limiting the widths of the slots or channels formed by the surfaces of the spherical-shaped sockets to accommodate the balls or pins as shown in FIG. 3 to preclude side-to-side motion, indicated by arrows 38, of the balls or pins therein.

Figure 8:
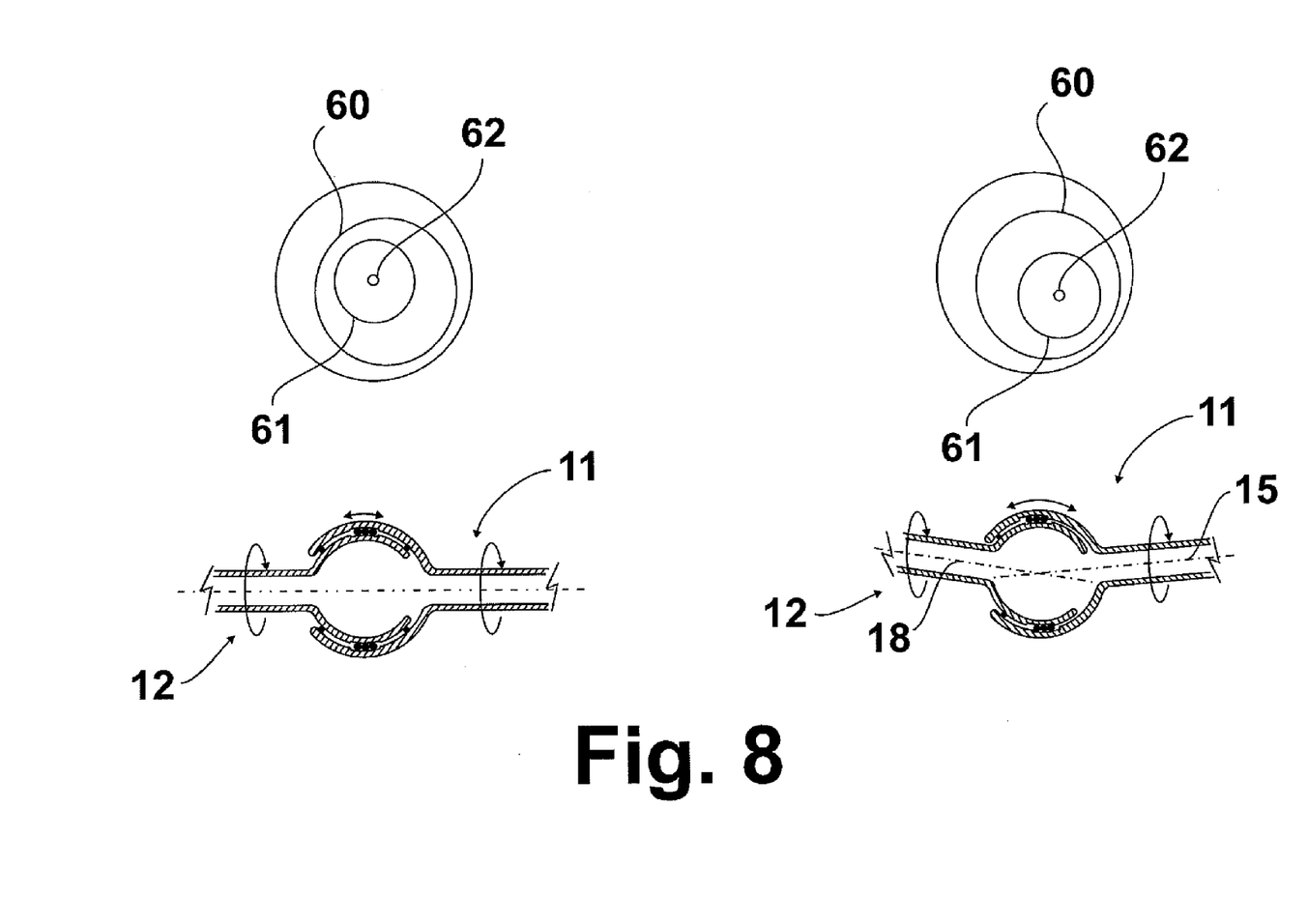
FIG. 8 is a diagram showing the operation of a rotary joint control means in accordance with one embodiment of this invention.

Rotary movement of the rotary joint may be achieved in accordance with one embodiment of this invention using shaft deflection assemblies that include eccentric rings as shown in FIG. 8. This type of assembly, which is known, includes two eccentric rings, outer ring 60 and inner ring 61, which are capable of relative rotation. Relative rotation between the two eccentric rings results in a relative displacement between the center of the outer ring and the center 62 of the inner ring, in turn resulting in relative rotation of the sockets of the rotary joint disposed within the interior of the two eccentric rings. The system may be designed such that at 0 degrees of rotation the centers of the two eccentric rings coincide and at 180 degrees the centers of the two eccentric rings have a maximum displacement. Other systems which may be suitable for relative rotation of the spherical-shaped sockets of the rotary joint of this invention are taught, for example, by U.S. Pat. No. 7,234,543, which is incorporated by reference herein in its entirety.

The rotary joint of this invention for a rotary steerable drilling system provides several advantages over conventional rotary steerable drilling systems. In particular, the rotary joint enables continuous uniform steering of the drill bit without interruption to the drill bit rotation. The rotary joint of this invention eliminates the need to bend the shaft and the associated resulting stresses and power requirements of conventional point-the-bit systems. The rotary joint of this invention provides a smooth transfer of speed and torque, ease of sealing and minimal friction. Finally, the rotary joint of this invention enables the use of relatively large flow-through openings so as to maximize the flow through of fluids.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A rotary joint comprising:
   a first rotary joint component having a first hollow rod, a first spherical-shaped socket fixedly connected with an end of said first hollow rod and adapted to provide fluid communication between said first hollow rod and said first spherical-shaped socket, and a first longitudinal axis, said first spherical-shaped socket having an external surface at least partially spherical;
   a second rotary joint component having a second hollow rod, a second spherical-shaped socket disposed within said first spherical-shaped socket fixedly connected with an end of said second hollow rod and adapted to provide fluid communication between said first hollow rod and said second hollow rod, and a second longitudinal axis;
   locking means for preventing independent rotation of said spherical-shaped sockets around their respective longitudinal axes; and
   rotary guide means for enabling relative rotary movement of said second spherical-shaped socket within said first spherical-shaped socket, wherein said guide means comprises at least one bearing disposed between said spherical-shaped sockets in a first indentation formed by an interior surface of said first spherical-shaped socket and a second indentation formed in an exterior surface of said second spherical-shaped socket opposite said first indentation, at least one of said first indentation and said second indentation having an elongated shape extending parallel with one of said first longitudinal axis and said second longitudinal axis, respectively, the bearing, the first indentation and the second indentation limiting a range of angles between said first longitudinal axis and said second longitudinal axis.

2. The rotary joint of claim 1 further comprising sealing means for sealing said second spherical-shaped socket with said first spherical-shaped socket so as to substantially preclude fluid flow between an inside and an outside of said rotary joint.

3. The rotary joint of claim 2, wherein said sealing means comprises at least one O-ring disposed in a corresponding circumferential groove formed by at least one of an interior surface of said first spherical-shaped socket and an exterior surface of said second spherical-shaped socket, said at least one O-ring sized to contact the other of said interior surface of said first spherical-shaped socket and said exterior surface of said second spherical-shaped socket.

4. The rotary joint of claim 1, wherein said second spherical-shaped socket is sized to provide substantial mating of an interior surface of said first spherical-shaped socket and an exterior surface of said second spherical-shaped socket.

5. The rotary joint of claim 4, wherein a lubricant is disposed between said first spherical-shaped socket and said second spherical-shaped socket.

6. The rotary joint of claim 1, wherein said guide means comprises at least one elongated ridge connected with an interior surface of said first spherical-shaped socket and extending in a direction parallel with said first longitudinal axis, said at least one elongated ridge disposed within a corresponding elongated groove formed by an exterior surface of said second spherical-shaped surface, said groove having a groove length greater than a ridge length of said elongated ridge.

7. The rotary joint of claim 1, wherein said guide means comprises at least one elongated ridge connected with an exterior surface of said second spherical-shaped socket and extending in a direction parallel with said second longitudinal axis, said at least one elongated ridge disposed within a corresponding elongated groove formed by an interior surface of said first spherical-shaped surface, said groove having a groove length greater than a ridge length of said elongated ridge.

8. The rotary joint of claim 1, wherein said guide means comprises at least one pin connected with an interior surface of said first spherical-shaped socket, said at least one pin extending into one of a corresponding elongated groove and a corresponding elongated slot formed by an exterior surface of said second spherical-shaped socket and extending in a direction parallel to said second longitudinal axis.

9. The rotary joint of claim 1, wherein said guide means comprises at least one pin connected with an exterior surface of said second spherical-shaped socket, said at least one pin extending into one of a corresponding elongated groove and a corresponding elongated slot formed by an interior surface of said first spherical-shaped socket and extending in a direction parallel to said first longitudinal axis.

10. The rotary joint of claim 1, wherein said first hollow rod has an opposite end connected with one of a drill string and a down hole assembly of a subterranean drilling rig and said second hollow rod has an opposite end connected with the other of said drill string and said down hole assembly of said subterranean drilling rig.

11. A rotary steerable drilling system comprising:
at least one hollow rotary joint assembly having a first rotary joint component having a first spherical-shaped socket fixedly connected with one end of a first hollow rod and a first longitudinal axis extending through said first spherical-shaped socket and said first hollow rod, said first spherical-shaped socket having an at least partially spherical outer surface, a second rotary joint component having a second spherical-shaped socket disposed within said first spherical-shaped socket fixedly connected with one end of a second hollow rod and having a second longitudinal axis extending through said second spherical-shaped socket and said second hollow rod, locking means for preventing independent rotation of said spherical-shaped sockets around their respective longitudinal axes, and rotary guide means for enabling relative rotary movement of said second spherical-shaped socket within said first spherical-shaped socket, wherein said guide means comprises at least one bearing disposed between said spherical-shaped sockets in a first indentation formed by an interior surface of said first spherical-shaped socket and a second indentation formed in an exterior surface of said second spherical-shaped socket opposite said first indentation, at least one of said first indentation and said second indentation having an elongated shape extending parallel with one of said first longitudinal axis and said second longitudinal axis, respectively, the bearing, the first indentation and the second indentation limiting an angle of bend between said first longitudinal axis and said second longitudinal axis.

12. The rotary steerable drilling system of claim 11 further comprising one of a drill string and a downhole assembly connected with said first hollow rod and the other of said drill string and said downhole assembly connected with said second hollow rod.

13. The rotary steerable drilling system of claim 12 further comprising sealing means for sealing said second spherical-shaped socket with said first spherical-shaped socket to substantially preclude fluid flow between an inside and an outside of said rotary joint assembly.

14. The rotary steerable drilling system of claim 13, wherein said sealing means comprises at least one O-ring disposed in a corresponding circumferential groove formed by one of an interior surface of said first spherical-shaped socket and an exterior surface of said second spherical-shaped socket, said at least one O-ring sized to contact the other of said interior surface of said first spherical-shaped socket and said exterior surface of said second spherical-shaped socket.

15. The rotary steerable drilling system of claim 11, wherein said second spherical-shaped socket is sized to provide substantial mating of an interior surface of said first spherical-shaped socket and an exterior surface of said second spherical-shaped socket.

16. The rotary steerable drilling system of claim 15, wherein a lubricant is disposed between said first spherical-shaped socket and said second spherical-shaped sockets.

17. The rotary joint of claim 11, wherein said guide means comprises at least one elongated ridge connected with an exterior surface of said second spherical-shaped socket and extending in a direction parallel with said second longitudinal axis, said at least one elongated ridge disposed within a corresponding elongated groove formed by an interior surface of said first spherical-shaped surface, said groove having a groove length greater than a ridge length of said elongated ridge.

18. The rotary joint of claim 11, wherein said guide means comprises at least one pin connected with an interior surface of said first spherical-shaped socket, said at least one pin extending into one of a corresponding elongated groove and a corresponding elongated slot formed by an exterior surface of said second spherical-shaped socket and extending in a direction parallel to said second longitudinal axis.

19. The rotary joint of claim 11, wherein said guide means comprises at least one pin connected with an exterior surface of said second spherical-shaped socket, said at least one pin extending into one of a corresponding elongated groove and a corresponding elongated slot formed by an interior surface of said first spherical-shaped socket and extending in a direction parallel to said first longitudinal axis.

\* \* \* \* \*